US011901688B2

(12) United States Patent
Giesbrecht

(10) Patent No.: US 11,901,688 B2
(45) Date of Patent: Feb. 13, 2024

(54) ADAPTER HOUSING FOR A CONTACT INSERT FOR FIXING ON A TOP-HAT RAIL

(71) Applicant: HARTING ELECTRIC GMBH & CO. KG, Espelkamp (DE)

(72) Inventor: Peter Giesbrecht, Porta Westfalica (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 368 days.

(21) Appl. No.: 17/298,861

(22) PCT Filed: Dec. 3, 2019

(86) PCT No.: PCT/DE2019/101035

§ 371 (c)(1),
(2) Date: Jun. 1, 2021

(87) PCT Pub. No.: WO2020/114557

PCT Pub. Date: Jun. 11, 2020

(65) Prior Publication Data

US 2022/0037813 A1 Feb. 3, 2022

(30) Foreign Application Priority Data

Dec. 7, 2018 (DE) ..................... 10 2018 131 310.1

(51) Int. Cl.

*H01R 9/24* (2006.01)
*H01R 9/26* (2006.01)
*H01R 13/514* (2006.01)
*H01R 13/518* (2006.01)

(52) U.S. Cl.

CPC ......... *H01R 9/2408* (2013.01); *H01R 9/2608* (2013.01); *H01R 13/514* (2013.01); *H01R 13/518* (2013.01)

(58) Field of Classification Search

CPC . H01R 9/24; H01R 9/408; H01R 9/26; H01R 9/2608; H01R 13/514; H01R 13/516; H01R 13/518

(Continued)

(56) References Cited

U.S. PATENT DOCUMENTS 4,469,393 A 9/1984 Chewning, Jr. et al.
2006/0082979 A1 * 4/2006 Brandl ............... H01H 11/0031 361/733

(Continued)

FOREIGN PATENT DOCUMENTS

CN 107069294 A 8/2017
DE 299 20 253 U1 2/2000

(Continued)

OTHER PUBLICATIONS

International Preliminary Report on Patentability; dated Jun. 8, 2021; for International Application No. PCT/DE2019/101035, 8 pages.

(Continued)

*Primary Examiner* — Khiem M Nguyen
(74) *Attorney, Agent, or Firm* — Seed IP Law Group LLP

(57) ABSTRACT

An adapter housing is provided for receiving a contact carrier, wherein the adapter housing has on its outer wall two connecting structures or means, molded on opposite one another and complementing one another, for reversibly connecting to an adapter housing of the same type and/or to a top-hat rail fixing element and wherein the adapter housing has on the inserting side at least one locking device or means for reversibly locking the adapter housing to a further adapter housing. A system comprising of a first adapter housing, with a first contact carrier received therein, a second adapter housing, with a second contact carrier received therein, and a top-hat rail is also provided.

14 Claims, 4 Drawing Sheets

(58) Field of Classification Search
USPC .................................................. 439/119, 709
See application file for complete search history.

(56) References Cited

U.S. PATENT DOCUMENTS

| | | | | |
|---|---|---|---|---|
| 2007/0010135 | A1 | 1/2007 | Ferderer | |
| 2011/0217880 | A1* | 9/2011 | Schmidt ............... | H01R 13/518 439/676 |
| 2018/0076539 | A1 | 3/2018 | Willems et al. | |
| 2019/0109404 | A1 | 4/2019 | Willems | |
| 2022/0037813 | A1* | 2/2022 | Giesbrecht ........... | H01R 9/2608 |

FOREIGN PATENT DOCUMENTS

| | | | |
|---|---|---|---|
| DE | 10 2013 101 830 | A1 | 7/2014 |
| DE | 10 2014 101 528 | A1 | 8/2015 |
| DE | 10 2015 105 545 | A1 | 10/2016 |
| DE | 10 2016 106 481 | B3 | 8/2017 |
| DE | 10 2016 119 061 | A1 | 4/2018 |
| DE | 20 2018 101 278 | U1 | 5/2018 |
| DE | 10 2017 105 408 | A1 | 9/2018 |
| EP | 0 899 824 | A2 | 3/1999 |
| EP | 1 742 299 | B1 | 12/2013 |

OTHER PUBLICATIONS

European Patent Office, International Search Report and Written Opinion for international application No. PCT/DE2019/101035, dated Feb. 14, 2020, 11 pages (with English translation of International Search Report).

German Patent Office, Office Action for German application No. 10 2018 131 310.1 dated Nov. 29, 2019, 10 pages.

* cited by examiner

ADAPTER HOUSING FOR A CONTACT INSERT FOR FIXING ON A TOP-HAT RAIL

BACKGROUND

Technical Field

This disclosure relates to an adapter housing for receiving a contact insert or carrier and furthermore relates to a system consisting of a first adapter housing, with a first contact insert or carrier received therein, a second adapter housing, with a second contact insert or carrier received therein, and a top-hat rail.

The adapter housings described herein widen the area of application of contact inserts or carriers already available on the market, which are otherwise designed specifically for plug connectors.

Description of the Related Art

DE 10 2017 105 408 A1 discloses series terminals, which serve, for example, for electrically wiring an installation. Such series terminals are generally fastened on a support rail, e.g., a top-hat rail, and mounted next to one another in a row in order to be assembled in a space-saving manner. Although, the width of the control cabinet is used effectively in this case, the depth of the available installation space remains unused.

In electrical equipment, series terminals are used for different applications, e.g., as protective switches, electronic circuit breakers, programmable controllers, etc. The individual series terminals must have different designs in respect of their function, whilst the shape of the housing must have a substantially identical design for assembly on the top-hat rail. Individual series terminals are manufactured in very small quantities and therefore incur high production costs.

BRIEF SUMMARY

Embodiments described herein provide an adapter housing for an already known contact insert or carrier of a plug connector and thereby widen the area of application of such contact inserts or carriers.

The inventive adapter housing is provided for receiving a contact insert or carrier which is generally already known. Such a contact insert or carrier is revealed in EP 1 742 299 B1, for example. The plug connector modules known from the field of modular industry plug connectors, disclosed, for example, in DE 20 2018 101 278 U1, can be defined as contact inserts or carriers within the context of this disclosure.

The adapter housing is preferably formed substantially as a hollow cuboid with a rectangular cross-section. Such forms can be manufactured easily and cost-effectively from plastic in an injection molding process.

Two adapter housings, each equipped with a contact insert or carrier, can be joined, whereby the contact inserts or carriers are mated with one another. The following also refers to adapter housings being mated with one another without explicitly mentioning the contact inserts or carriers. The direction in which the adapter housing are each moved for this purpose is also referred to below as the mating direction. The ends of the adapter housing which are joined in the mating procedure are also referred to accordingly as mating side.

The adapter housing has on its outer wall two connecting structures or means, integrally formed opposite one another.

The connecting structures or means are configured to be complementary to one another. This means the contour of the connecting structures or means on the one side would fit into the connecting structures or means on the other. With the aid of the connecting structures or means, two similar adapter housings can be reversibly connected to one another.

A first one of the connecting structures or means preferably consists or comprises of two hook-shaped connecting contours and a connecting lug arranged between said connecting contours. A second one of the connecting structures or means consists or comprises of two connecting grooves matching the hook-shaped connecting contours, and a connecting pin arranged between said connecting grooves and matching the connecting lug. This design of the connecting structures or means enables a user-friendly and simultaneously stable connection of two adapter housings. Any number of similar adapter housings can therefore be arranged in a row.

At least one locking device or means is integrally formed on the mating side of the adapter housing for reversibly locking the adapter housing to a further adapter housing. The locking device or means serves predominantly so that a mating connection between the contact inserts or carriers cannot be inadvertently released.

The adapter housing advantageously has two locking devices or means integrally formed opposite one another for reversibly locking the adapter housing to a second adapter housing mated therewith. A particularly reliable locking of two adapter housings to one another can thus be realized.

In a particularly advantageous configuration, the locking devices or means are each formed as frame-shaped receptacles or as lugs pointing in the mating direction. In the case of two adapter housings which are mated and locked to one another, one adapter housing is equipped with the frame-shaped receptacles and the other adapter housing is equipped with the matching lugs, pointing in the mating direction. Such a locking mechanism can be easily integrally formed on the adapter housing in the injection molding process. Moreover, such a locking mechanism is easy to operate.

The adapter housing preferably has a fastening device or means for reversibly fastening the contact insert or carrier in the adapter housing. The fastening device or means is preferably designed as a separate component and can be reversibly fastened or latched on the outside of the adapter housing. The contact insert or carrier can be inserted into the adapter housing. The contact insert or carrier is then fastened or fixed in the adapter housing by the latching of the fastening device or means.

The adapter housing preferably has an opening and the fastening device or means has a matching peg, wherein the peg of the fastening device or means reaches through the opening of the adapter housing. In this case, the peg moves into an opening of the contact insert or carrier and fixes this latter in the adapter housing. This solution is particularly advantageous since the opening in the contact insert or carrier already exists in some known contact inserts or carriers. This refers to a screw thread, for example, which otherwise serves for fixing the contact insert or carrier to a metal plug connector housing and for establishing electrical contact (PE) between said contact carrier and said plug connector housing.

In a particularly preferred embodiment of the invention, the adapter housing has a top-hat rail fixing element for fixing the adapter housing on a top-hat rail. The adapter housings with the integrated contact inserts or carriers can thus be mounted in a row on a top-hat rail. The top-hat rail fixing element is fastened to a connecting structure or means of the adapter housing. On the other side of the adapter housing, a further adapter housing together with a contact insert or carrier can be fastened on the second connecting structure or means. Therefore, in addition to the top-hat rail plane, a plane aligned perpendicularly thereto can also be equipped with an adapter housing. This opens up a hitherto unused installation space in the control cabinet, for example.

The top-hat rail fixing element has two connecting arrangements or means, each for reversibly connecting to an adapter element. The connecting arrangements or means each comprise or consist of two connecting grooves and a connecting pin arranged between said connecting grooves. The connecting arrangements or means of the top-hat rail fixing element are therefore configured to be at least mostly identical to the second connecting structures or means of the adapter housing.

The two connecting arrangements or means of the top-hat rail fixing element, as seen in the mating direction, are arranged behind one another. Accordingly, two mutually mated adapter housings can be fastened on a top-hat rail fixing element and moreover fixed on a top-hat rail.

The top-hat rail fixing element preferably has at least one opening, but preferably three openings, via which the top-hat rail fixing element can be fixed to an appliance wall. Therefore, the adapter housings can be fixed not only on a top-hat rail but also in other locations, for example to an appliance wall. The adapter housing can be used in a versatile manner owing to the top-hat rail fixing element.

The top-hat rail fixing element is designed as a separate component and can be reversibly fastened on the outside of the adapter housing. Since the number of required top-hat rail fixing elements is generally smaller than the number of required adapter housings, this enables good storage management.

BRIEF DESCRIPTION OF THE SEVERAL VIEWS OF THE DRAWINGS

An exemplary embodiment of the invention is illustrated in the drawings and will be explained in more detail below. In the drawings.

The figures may contain partially simplified, schematic illustrations. Identical reference signs are sometimes used for elements which are similar, but possibly not identical. Various views of similar elements could be drawn to different scales.

DETAILED DESCRIPTION

Figure 1:
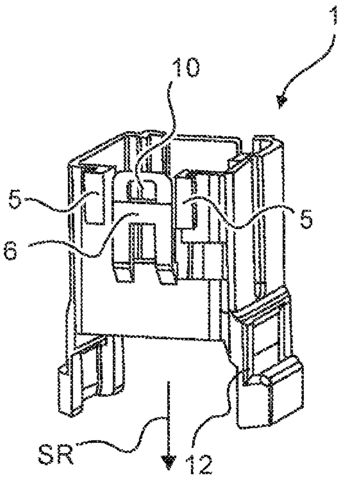
FIG. 1 shows a perspective illustration of a first inventive adapter housing.
Figure 2:
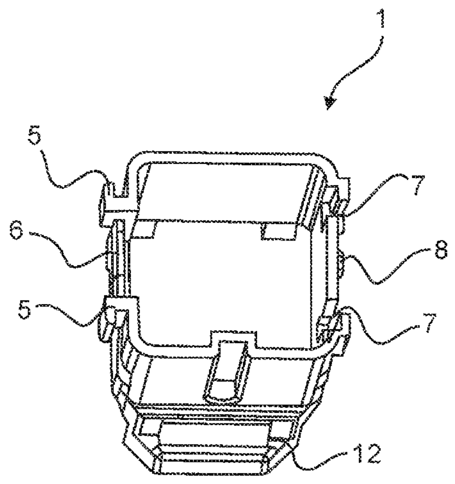
FIG. 2 shows a further perspective illustration of the first inventive adapter housing.

FIGS. 1 and 2 show a first exemplary embodiment of a first adapter housing 1.

The adapter housing 1 shown here is provided for receiving a contact insert or carrier 2. The contact insert or carrier 2 is equipped with pin contact elements 3. Such a contact insert or carrier 2 is therefore also referred to among experts as a pin contact insert or carrier 2 or male contact insert or carrier 2. Since the contact insert or carrier 2 is already known from the prior art, it is not described in greater detail below.

Figure 3:
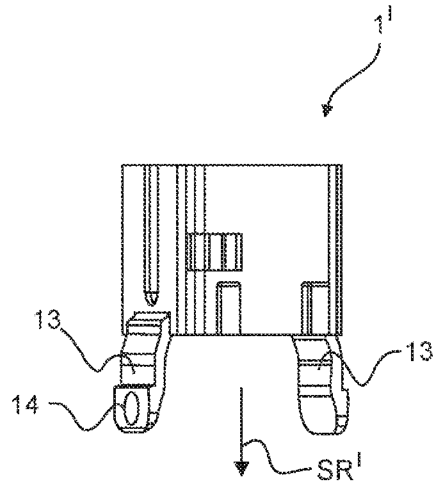
FIG. 3 shows a perspective illustration of a second inventive adapter housing.
Figure 4:
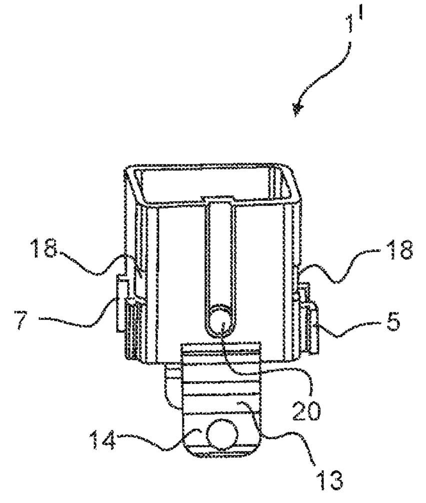
FIG. 4 shows a further perspective illustration of the second inventive adapter housing.

FIGS. 3 and 4 show a first exemplary embodiment of a second adapter housing 1'. The adapter housing 1' shown here is provided for receiving a contact insert or carrier 2'. The contact insert or carrier 2' is equipped with socket contact elements (not shown). Such a contact insert or carrier is therefore also referred to among experts as a socket contact insert or carrier 2' or female contact insert or carrier 2'. Since the contact insert or carrier 2' is already known from the prior art, it is not described in greater detail below.

Figure 5:
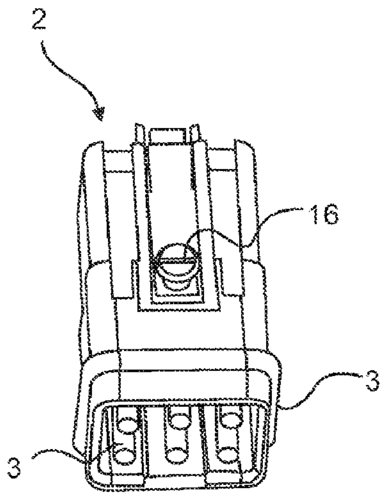
Fig. 5 (PRIOR ART)
FIG. 5 shows a perspective illustration of a contact insert or carrier with pin contact elements.
Figure 6:
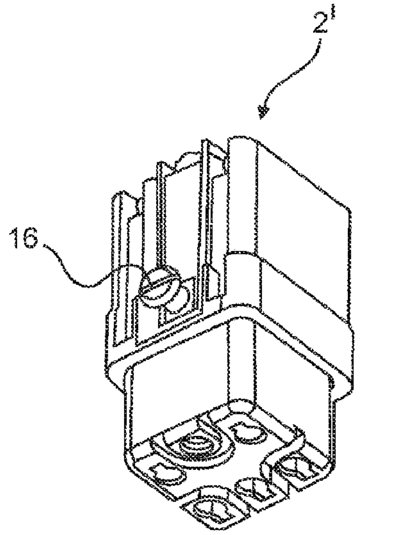
Fig. 6 (PRIOR ART)
FIG. 6 shows a perspective illustration of a contact insert or carrier with socket contact elements.

The contact inserts or carriers 2, 2' can be seen in FIGS. 5 and 6. Approximately in the center, the contact inserts or carriers 2, 2' have a bore with an internal thread in which a screw 16 is screwed. This screw 16 is used to fix the contact insert or carrier 2, 2' in a plug connector housing (not shown).

Figure 7:
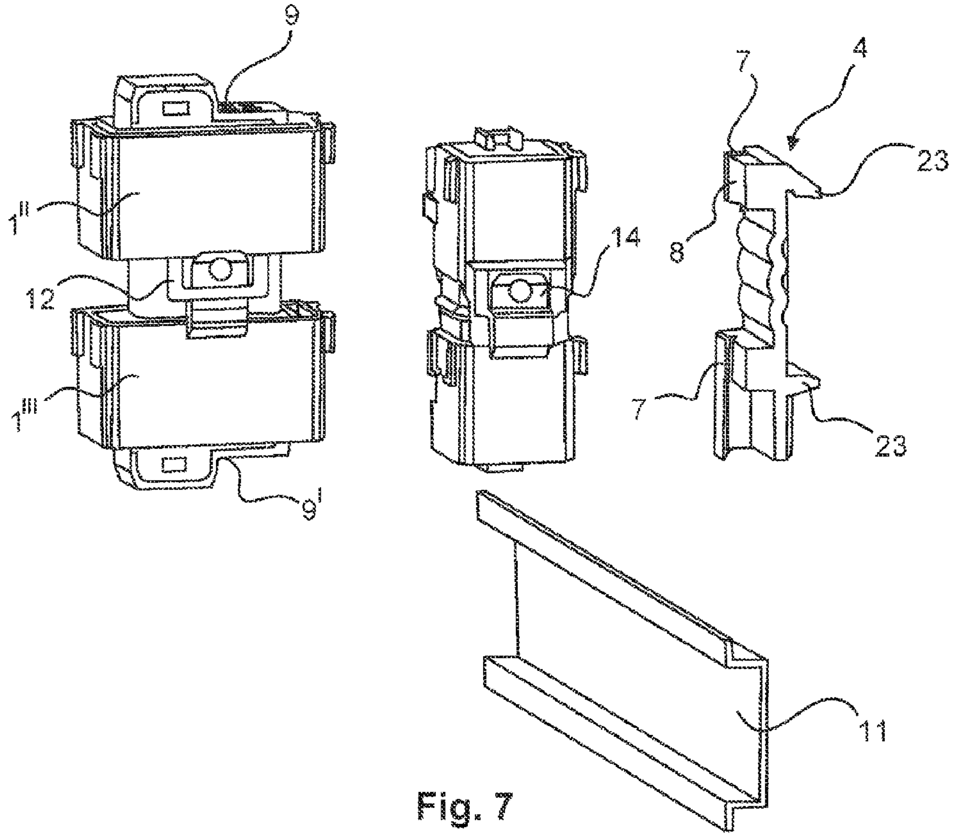
FIG. 7 shows an exploded drawing of a system comprising or consisting of a top-hat rail, a top-hat rail fixing element, a first and a second adapter housing and a further exemplary embodiment of a first and a second adapter housing.
Figure 10:
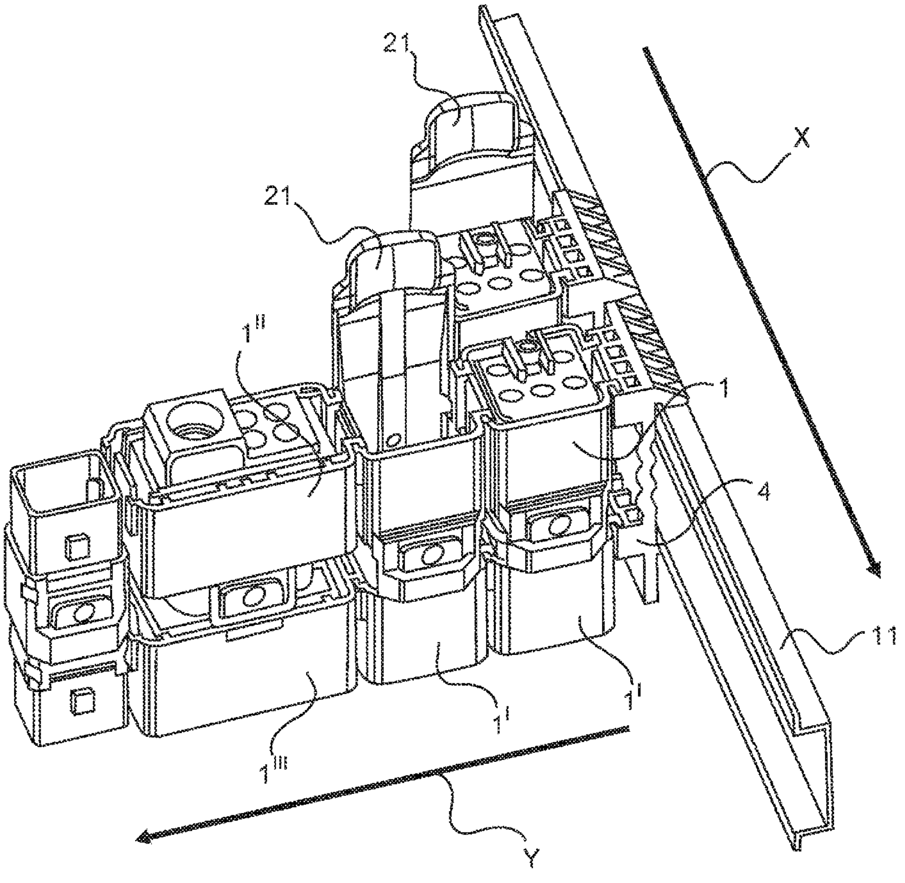
FIG. 10 shows a system comprising or consisting of a plurality of inventive adapter housings, which are fastened in an array on a top-hat rail.

Another further exemplary embodiment of a first and second adapter hosing 1", 1'" can be seen in each case in FIGS. 7 and 10. This further exemplary embodiment of the adapter housing 1", 1'" is provided for receiving plug connector modules 9 which are predominantly used in heavy industry plug connectors and are already sufficiently known from the prior art.

The adapter housings 1, 1', 1", 1'" are formed substantially as hollow cuboids with a rectangular cross-section. The internal geometry is adapted to the external geometry of the respective contact insert or carrier 2, 2'. The adapter housing 1, 1', 1", 1'" has on its outer wall two connecting structures or means, integrally formed opposite one another and configured to be complementary to one another, for reversibly connecting to a similar adapter housing 1, 1', 1", 1'" and/or to a top-hat rail fixing element 4.

A first one of the connecting structures or means of the adapter housing 1, 1', 1", 1'" comprises or consists of two hook-shaped connecting contours 5 and a connecting lug 6 arranged between said connecting contours. A second one of the connecting structures or means comprises or consists of two connecting grooves 7 matching the hook-shaped connecting contours, and a connecting pin 8 arranged between said connecting grooves 7 and matching the connecting lug 6.

It can be seen in FIG. 10 how a plurality of adapter housings 1, 1', 1", 1'" are connected to one another and fastened on a top-hat rail 11. When connecting two adapter housings 1, 1', 1", 1'", the hook-shaped connecting contours 5 of the one adapter housing 1, 1', 1", 1'" engage in the matching connecting grooves 7 of the other adapter housing 1, 1' 1", 1'". The recess 10 of the connecting lug 6 of the one adapter housing 1, 1', 1", 1'" then snaps over the respective connecting pin 8 of the other (adjacent) adapter housing 1, 1', 1'', 1''', thereby realizing a secure connection between the adapter housings 1, 1', 1'', 1'''. To release this connection, the connecting lug 6, for example with the aid of a screwdriver, can be comfortably pried off the connecting pin 8. However, it is also possible to pry the connecting lug 6 off the connecting pin 8 manually, without a screwdriver. The adapter housings, 1, 1', 1'', 1''' can then be simply pulled apart in opposite directions. The connection and release of an adapter housing 1, 1', 1'', 1''' to and from a top-hat rail fixing element 4 takes place analogously. To this end, the top-hat rail fixing element 4 is equipped with two pairs of connecting grooves 7, which are arranged behind one another.

Figure 9:
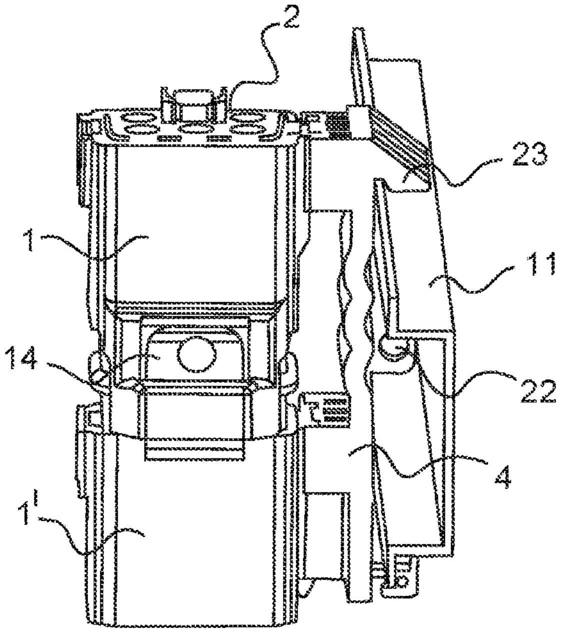
FIG. 9 shows a perspective illustration of the first and second adapter housing, which are fastened on a top-hat rail via the top-hat rail fixing element.

The adapter housing 1, 1', 1'', 1''' has on the mating side at least one locking device or means for reversibly locking the adapter housing 1, 1', 1'', 1''' to a further adapter housing 1, 1', 1'', 1'''. The locking device or means in the case of the first adapter housing 1, 1'' are each formed as frame-shaped receptacles 12. In the case of the second adapter housing 1', 1''', the locking device or means are formed as locking lugs 13 pointing in the mating direction SR', each with locking hooks 14 at the end. During the joining of the adapter housings 1, 1', 1'', 1''', in each case in the mating direction SR, SR', the locking lugs 13 of the second adapter housing 1', 1''' engage in the frame-shaped receptacles 12 of the first adapter housing 1, 1''. In this case, the locking lugs 13 are firstly bent back slightly and then snap back, whereby the locking hooks 14 engage with an undercut of the frame-shaped receptacle 12. Two mutually locked adapter housings 1, 1' can be seen in FIG. 9, for example.

The locking lugs 13 can subsequently be pried out of the frame-shaped receptacle 12, for example with the aid of a screwdriver. The locking of the adapter housings 1, 1', 1'', 1''' can thus be released again. The adapter housings 1, 1', 1'', 1''' can be pulled apart again in opposition to their respective mating direction SR, SR', whereby the mating connection of the contact carriers 2, 2' is also released again.

Figure 8:
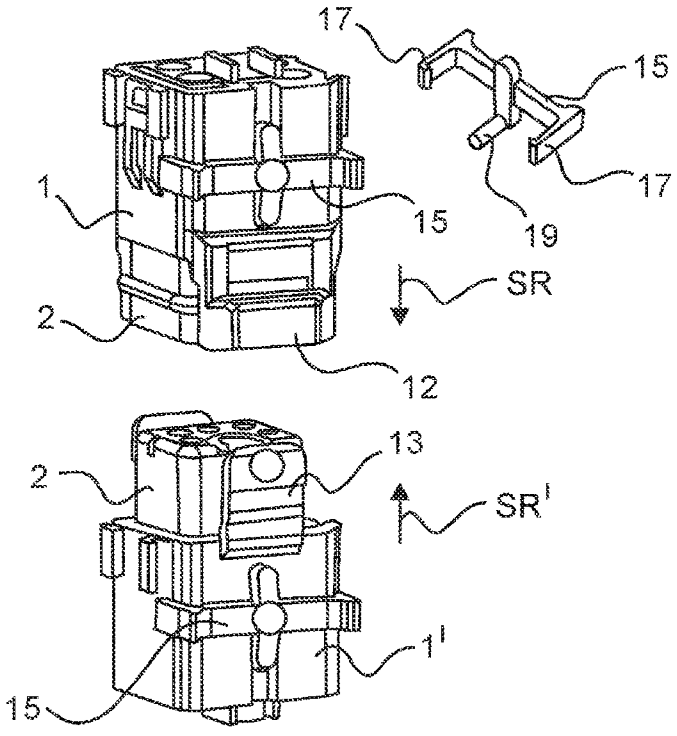
FIG. 8 shows a perspective illustration of the first and second adapter housing, each with a first and second contact insert or carrier integrated therein.

Two adapter housings 1, 1' with a fastening device or means 15 for reversibly fastening the contact carrier 2, 2' in the respective adapter housing 1, 1' can be seen in FIG. 8. The fastening device or means 15 is designed as a separate component and, for illustrative purposes, is again illustrated separately on the top right in FIG. 8. The fastening device or means 15 can be reversibly fastened on the outside of the adapter housing 1, 1'. To this end, the fastening device or means 15 has two outer latching arms with latching hooks 17, which engage with a specifically provided undercut 18 of the respective adapter housing 1, 1'. The fastening device or means 15 has a peg 19. The adapter housing 1, 1' has an opening 20 provided for the peg 19. The opening 20 of the adapter housing 1, 1' correlates to the screw opening of the contact insert or carrier 2, 2' in the inserted state. The peg 19 of the fastening device or means 15 projects through the opening 20 of the adapter housing 1, 1' and engages in an opening (screw opening) of the contact insert or carrier 2, 2', whereby the contact insert or carrier 2, 2' is reversibly fastened in the adapter housing. The fastening device or means 15 can be released from the adapter housing 1, 1' again with the aid of a suitable tool, for example a screwdriver, and the contact insert or carrier 2, 2' can be removed again. A tool-less removal of the fastening device or means 15 is also possible. Features which are already present in the contact insert or carrier 2, 2'—in this case, the screw opening—are used for fastening the contact insert or carrier 2, 2' in the adapter housing 1, 1'. Identical contact inserts or carriers 2, 2' can therefore be used in the plug connector housing in the conventional manner, but also in the adapter housing 1, 1'.

The housing of an adapter housing 1 can be extended on the cable connection side and form a semi-circular depression 21. Conductors (not shown) which are connected to the contact insert or carrier 2 can be fastened in this depression 21, for example via a cable connector. Strain relief is thus provided for the conductors or cables connected to the contact insert or carrier 2.

The top-hat rail fixing element 4 has openings 22. The top-hat rail fixing element 4 can be assembled on an appliance wall, for example, via these openings 22. The area of application of the adapter housing 1, 1', 1'', 1''' is thus further expanded. The top-hat rail fixing element 4 has latching contours 23 with which the top-hat rail fixing element 4 can be fixed on a top-hat rail 11. The contours 23 are configured for commercially available top-hat rails 11.

One application of the inventive adapter housing 1, 1', 1'', 1''' is illustrated in FIG. 10. Multiple pairs of adapter housings 1, 1' together with integrated and mutually mated contact inserts or carriers 2, 2' can be arranged in a row along the x axis via the top-hat rail fixing element 4. At the same time, further adapter housings 1, 1', 1'', 1''', which extend along the y axis, can be connected on the other side of the respective adapter housings 1, 1', 1'', 1'''. Such an arrangement of adapter housings 1, 1', 1'', 1''' is also referred to as an array. An array of any design can be generated with the inventive adapter housing 1, 1', 1'', 1'''. The installation space, for example in a control cabinet, is optimally used.

Even where combinations of different aspects or features of the invention are shown in the figures in each case, it is clear to a person skilled in the art—unless indicated otherwise—that the combinations shown and discussed are not the only possible combinations. In particular, mutually corresponding units or feature complexes from different exemplary embodiments can be interchanged with one another. Put another way, aspects and features of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An adapter housing for receiving a contact carrier and for fixing to a top-hat rail, the adapter housing comprising:

a first connecting structure integrally formed on a first side of an outer wall of the adapter housing and a second connecting structure integrally formed on a second side of the outer wall of the adapter opposite the first side, the first and second connecting structures being positioned opposite one another and configured to be complementary to one another, for reversibly connecting to a similar adapter housing and/or to a top-hat rail fixing element to enable the adapter housing and one or more similar adapter housings to be attached together side-by-side in a direction that is perpendicular to a plug-in direction of the contact carrier and perpendicular to a longitudinal direction of the top-hat rail; and at least one locking device provided on a mating side of the adapter housing for reversibly locking the adapter housing to a further adapter housing in the plug-in direction of the contact carrier.

2. The adapter housing as claimed in claim 1, wherein
the first connecting structure consists of two hook-shaped connecting contours and a connecting lug arranged between said connecting contours, and
the second connecting structure consists of two connecting grooves matching the hook-shaped connecting contours, and a connecting pin arranged between said connecting grooves and matching the connecting lug.

3. The adapter housing as claimed in claim 1, wherein the adapter housing has two locking devices integrally formed opposite one another for reversibly locking the adapter housing to the further adapter housing in the plug-in direction.

4. The adapter housing as claimed in claim 3, wherein the locking devices are each formed as frame-shaped receptacles or as locking lugs pointing in the plug-in direction.

5. The adapter housing as claimed in claim 1, wherein the adapter housing has a fastening device for reversibly fastening the contact carrier in the adapter housing.

6. The adapter housing as claimed in claim 5, wherein the fastening device is designed as a separate component and can be reversibly latched on an outside of the adapter housing.

7. The adapter housing as claimed in claim 6, wherein the adapter housing has an opening and in that the fastening device has a peg, wherein the peg of the fastening device reaches through the opening of the adapter housing.

8. The adapter housing as claimed in claim 1, wherein the adapter housing is formed substantially as a hollow cuboid with a rectangular cross-section.

9. The adapter housing as claimed in claim 1, wherein the adapter housing has a top-hat rail fixing element for fixing the adapter housing on a top-hat rail.

10. The adapter housing as claimed in claim 9, wherein
the top-hat rail fixing element has two connecting arrangements, each for reversibly connecting to an adapter element, and
in that the connecting arrangement each consist of two connecting grooves and at least one connecting pin arranged between said connecting grooves.

11. The adapter housing as claimed in claim 10, wherein the two connecting arrangements of the top-hat rail fixing element, as seen in the plug-in direction, are arranged behind one another.

12. The adapter housing as claimed in claim 9, wherein the top-hat rail fixing element has at least one opening via which the top-hat rail fixing element can be fixed to an appliance wall.

13. The adapter housing as claimed in claim 9, wherein the top-hat rail fixing element is designed as a separate component and can be reversibly fastened on the outside of the adapter housing.

14. A system comprising a first adapter housing as claimed in claim 1, with a first contact carrier received therein, a second adapter housing as claimed in claim 1 with a second contact carrier received therein, and a top-hat rail.

* * * * *